(12) United States Patent
Zhu

(10) Patent No.: US 9,996,182 B2
(45) Date of Patent: Jun. 12, 2018

(54) METHOD AND SYSTEM FOR RECOGNIZING CONFIRMATION TYPE TOUCH GESTURE BY TOUCH TERMINAL

(71) Applicant: SHENZHEN GOODIX TECHNOLOGY CO., LTD., Shenzhen, Guangdong (CN)

(72) Inventor: Xinghuo Zhu, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 19 days.

(21) Appl. No.: 13/886,281

(22) Filed: May 3, 2013

(65) Prior Publication Data

US 2013/0278526 A1    Oct. 24, 2013

(30) Foreign Application Priority Data

Apr. 20, 2012    (CN) .......................... 2012 1 0132826

(51) Int. Cl.
*G06F 3/041* (2006.01)
*G06F 3/0488* (2013.01)
*G06F 3/01* (2006.01)

(52) U.S. Cl.
CPC ............ *G06F 3/0416* (2013.01); *G06F 3/016* (2013.01); *G06F 3/0488* (2013.01)

(58) Field of Classification Search
CPC .......... G06F 3/041; G06F 3/042; G06F 3/043; G06F 3/044; G06F 3/045; G06F 3/046; G06F 3/047

USPC ................................................. 345/173–178
See application file for complete search history.

(56) References Cited

U.S. PATENT DOCUMENTS

| | | | |
|---|---|---|---|
| 2004/0160421 A1* | 8/2004 | Sullivan | G06F 3/043 345/173 |
| 2005/0078093 A1* | 4/2005 | Peterson et al. | 345/173 |
| 2006/0279548 A1* | 12/2006 | Geaghan | G06F 3/0416 345/173 |
| 2008/0150902 A1* | 6/2008 | Edpalm et al. | 345/173 |
| 2010/0060604 A1* | 3/2010 | Zwart | G06F 1/1601 345/173 |
| 2010/0253652 A1* | 10/2010 | Homma | G06F 3/016 345/177 |
| 2012/0256845 A1* | 10/2012 | Noble | 345/173 |
| 2013/0036377 A1* | 2/2013 | Colley | G06F 3/0488 715/764 |

(Continued)

*Primary Examiner* — Christopher Kohlman

(57) ABSTRACT

The present invention relates to touch technology and provides a method and a system for recognizing a confirmation type touch gesture by a touch terminal. The method includes step A of further determining whether a vibration signal indicative of an occurrence of the confirmation type touch gesture is detected when the touch terminal detects a valid touch event on a touch screen, and step B of recognizing the valid touch event as a true confirmation type touch gesture if the determination result of step A is yes. The present invention has the following advantages: when detecting a valid touch event, the present invention further determines whether there is a suggestive vibration signal associated with the touch gesture operation. Only when both the touch event and vibration signal are detected, the valid touch event is considered as the true confirmation type touch gesture operation. Therefore, the recognition result is more reliable.

14 Claims, 2 Drawing Sheets

(56) References Cited

U.S. PATENT DOCUMENTS

2013/0257821 A1* 10/2013 Chaine et al. ................ 345/177

* cited by examiner

METHOD AND SYSTEM FOR RECOGNIZING CONFIRMATION TYPE TOUCH GESTURE BY TOUCH TERMINAL

CROSS-REFERENCE TO RELATED APPLICATIONS

This present application is a Continuation Application of PCT application No. PCT/CN2012/087692 filed on Dec. 27, 2012, which claims the benefit of Chinese Patent Application No. 201210132826.4 filed on Apr. 20, 2012; the contents of which are hereby incorporated by reference.

FIELD

The present invention relates to touch screen technology and, more particularly, to a method and a system for recognizing a confirmation type touch gesture by a touch terminal.

BACKGROUND

Nowadays, more and more terminal devices' screens support touch type human-machine interfaces. Among the touch type interfaces, capacitive touch screens have been widely used. The capacitive touch screens currently widely used in mobile terminal devices such as mobile phones, tablet PCs or notebook computers provide users with fresh new operation experiences. However, the capacitive screens have some defects. One of the defects is that the capacitive touch screen is unable to detect a force of a touch and therefore the touch terminal device is unable to reliably distinguish between accidental and intended touch operations. This problem is especially apparent for some keypress operations. For example, when performing some key confirmation operations, a hesitant or accidental touch by a finger may also be detected and recognized as an intended touch, thus leading to an undesirable result. If this touch operation relates to transaction and payment, it may cause bigger safety potential and more serious consequences.

SUMMARY

Accordingly, the present invention is directed to a method for recognizing a confirmation type touch gesture by a touch terminal, which can enable the touch terminal to reliably recognize the true confirmation type touch gesture operation.

The present invention is also directed to a system for recognizing a confirmation type touch gesture by a touch terminal.

The present invention provides a method for recognizing a confirmation type touch gesture by a touch terminal, comprising:
  step A of further determining whether a vibration signal indicative of an occurrence of the confirmation type touch gesture is detected which meets a preset characteristic condition when the touch terminal detects a valid touch event on a touch screen; and
  step B of recognizing the valid touch event as a true confirmation type touch gesture if the determination result of step A is yes.

In one embodiment, at step A, the vibration signal indicative of the occurrence of the confirmation type touch gesture is the vibration signal caused by a tap touch on a panel of the touch terminal.

In one embodiment, at step A, determining whether the vibration signal indicative of the occurrence of the confirmation type touch gesture is detected which meets the preset characteristic condition comprises:
  step A1 of determining whether there is the vibration signal meeting the preset characteristic condition with a preset period of time prior to and after the valid touch event;
  step A2 of further determining whether the vibration signal and a reference vibration signal meet a preset similarity or correlation coefficient threshold condition by comparing characteristic index parameters of the vibration signal and the reference vibration signal; and
  step A3 of determining that the vibration signal indicative of the occurrence of the confirmation type touch gesture is detected which meets the preset characteristic condition if the determination result of step A2 is yes.

In one embodiment, the characteristic index parameters comprise frequency-domain parameters and time-domain parameters.

In addition, the present invent provides a system for recognizing a confirmation type touch gesture by a touch terminal, comprising:
  a touch detection unit configured to detect whether there is a valid touch event on a touch screen of the touch terminal;
  a vibration signal detection unit configured to detect and record a vibration signal; and
  a confirmation type touch gesture recognition unit configured to determine whether the vibration signal detection unit detects a vibration signal indicative of an occurrence of the confirmation type touch gesture which meets a preset characteristic condition when the touch terminal detects a valid touch event on a touch screen, and recognize the valid touch event as a true confirmation type touch gesture if the determination result is yes.

In one embodiment, the vibration signal detection unit comprises:
  a vibration sensor mounted within the touch terminal; and
  a vibration detection control module coupled to the vibration sensor and configured to determine whether the vibration sensor detects the vibration signal indicative of the occurrence of the confirmation type touch gesture which meets the preset characteristic condition within the preset period of time prior to and after the valid touch event.

In one embodiment, the vibration sensor may be a microphone device or an MEMS device.

The present invention is also directed to a touch terminal comprising the system for recognizing a confirmation type touch gesture as described above.

In comparison with the prior art, the present invention has the following advantages: when detecting a valid touch event, the present invention further determines whether there is a suggestive vibration signal associated with the touch gesture operation. Only when both the touch event and the vibration signal are detected, the valid touch event is considered as the true confirmation type touch gesture operation. Therefore, the recognition result is more reliable, and mis-operations can be avoided when the touch terminal wants the user to input the confirmation operation.

DESCRIPTION OF THE EMBODIMENTS

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

When a touch terminal wants a user to input a confirmation operation, upon detecting a valid touch event, the present invention further determines whether a vibration signal indicative of an occurrence of a confirmation type touch gesture is detected which meets a preset characteristic condition. The touch event is considered as a true confirmation type touch gesture operation needed by the touch terminal only when both the touch event and such vibration signal are detected.

Figure 1:
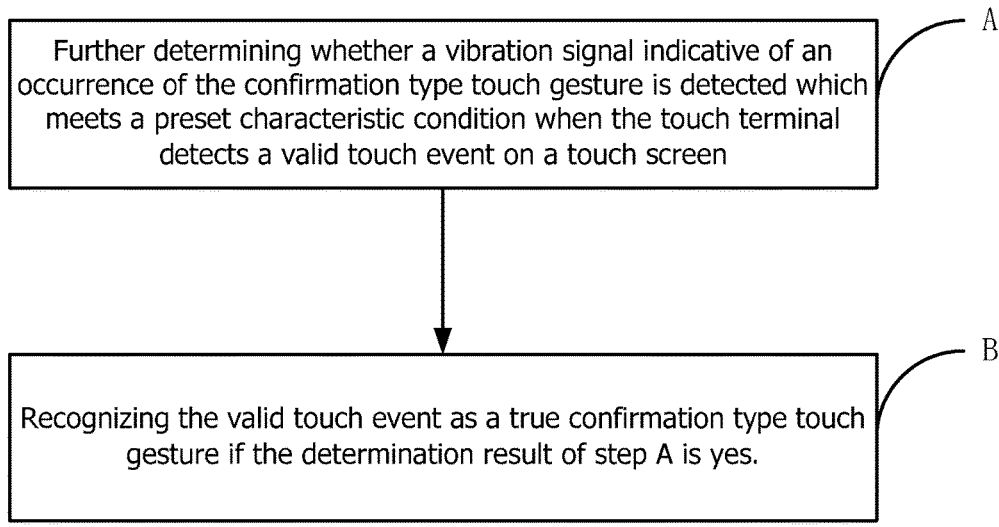
FIG. 1 is a flow chart of a method for recognizing a confirmation type touch gesture by a touch terminal according to one embodiment.

FIG. 1 is a flow chart of a method for recognizing a confirmation type touch gesture by a touch terminal as detailed below.

At step A, when the touch terminal detects that there is a valid touch event on the touch screen, the touch terminal further determines whether a vibration signal indicative of an occurrence of a confirmation type touch gesture is detected which meets a preset characteristic condition within a preset period of time prior to and after the valid touch event.

At step B, if the determination result of step A is yes, then it is determined that the valid touch event is a true confirmation type touch gesture operation.

Figure 2:
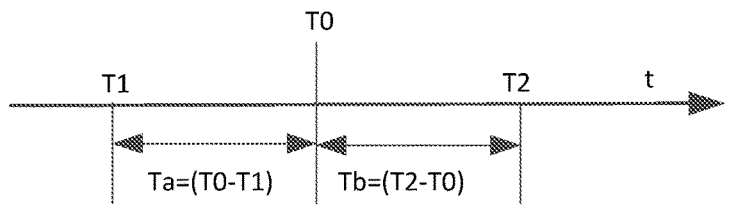
FIG. 2 illustrates a time relationship between the valid touch event and a vibration signal indicative of a confirmation type touch gesture operation according to one embodiment.

As shown in FIG. 2, assuming the valid touch event occurs at time T0, if a vibration signal indicative of an occurrence of a confirmation type touch gesture is detected which meets a preset characteristic condition within a period of time Ta prior to or a period of time Tb after T0, then it is determined that a true confirmation type touch gesture operation is detected. Depending upon the system designs of different touch terminals, there is a lag time between the detected touch event and the vibration signal. That is, the vibration signal may occur prior to or after the touch event. In general, the value of Ta and Tb may be selected to be less than 50 ms. In addition, it is noted that the term "valid touch event" used herein may refer to a multi-touch event if the touch events of the multiple points concur within a specific time range (for example, 50 ms).

The vibration signal indicative of the occurrence of the confirmation type touch gesture may be generated by various forms of specific touch operations, for example, tap operations on a panel of the touch terminal such as single-tap, double-tap. The tap operations may occur on a touch screen area or on an area of the panel outside the touch screen. According to the method described and illustrated above, the touch event ought to occur on the touch panel, but a tap position is allowed to be different from a touch position. In most cases, the vibration signal is generated by a finger directly tapping on the touch panel. The following description is made taking the example of tap operations on the touch screen.

Figure 3:
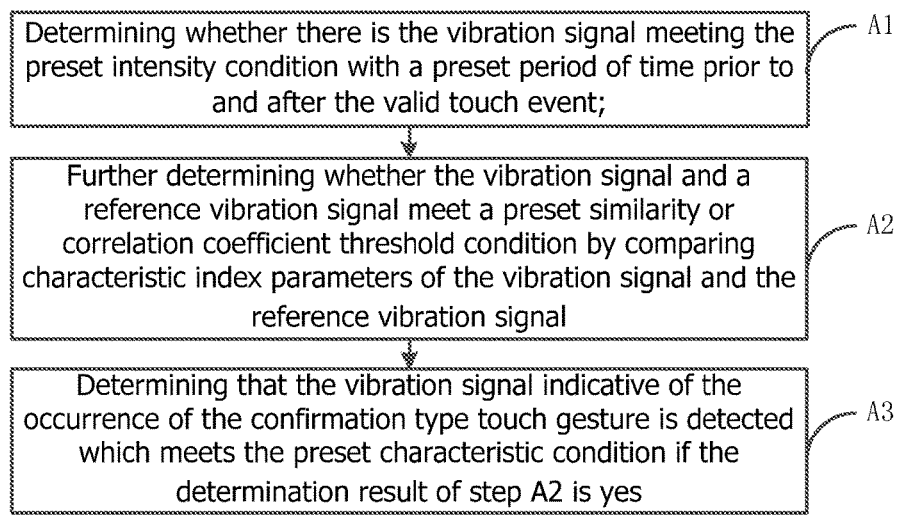
FIG. 3 is a flow chart of detecting whether there is a vibration signal indicative of an occurrence of a confirmation type touch gesture which meets a preset characteristic condition according to one embodiment.
Figure 4:
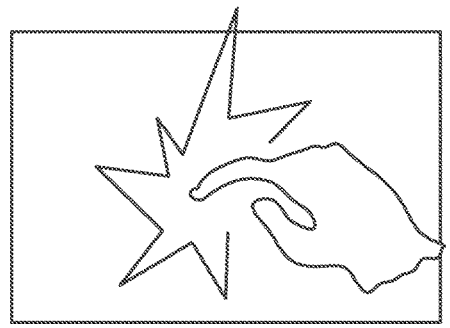
FIG. 4 illustrates a tap operation on a panel according to one embodiment.

Referring to FIG. 3, the step A of determining whether a vibration signal indicative of an occurrence of a confirmation type touch gesture is detected which meets a preset characteristic condition is described in detail below.

At step A1, it is determined whether there is a vibration signal which meets a preset intensity condition within the preset period of time prior to and after the valid touch event.

Figure 5:
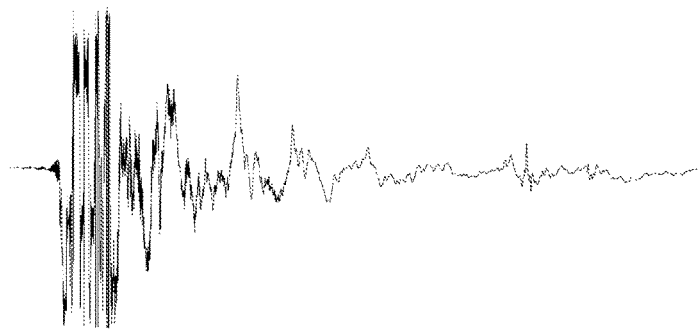
FIG. 5 illustrates a vibration signal waveform caused by a tap operation.

As described above, a finger tap on the touch panel not only allows the touch panel to detect a touch event, but it also allows the touch terminal to detect a vibration signal of the touch terminal body. FIG. 5 illustrates a waveform recorded by a microphone mounted closely next to the panel caused by a tap touch gesture on the panel. Due to the complicatedness of analysis of the recorded vibration waveform, signal intensity, a relatively simple characteristic index of the vibration signal, is first examined. There are several methods of examining the vibration signal intensity, a relatively simple one of which may be that: an amplitude threshold of a vibration signal is preset; the number of sampling points with amplitude beyond the amplitude threshold is accumulatively calculated; if the number of the beyond-threshold sampling points exceeds a maximum number, it is determined that the intensity of the vibration signal meets the preset intensity condition. It is noted that, in this method, the amplitude of the waveform takes the absolute value of its sampled value.

At step A2, if the determination result of step A1 is yes, then it is further determined whether the vibration signal and a reference vibration signal meet a preset similarity or correlation coefficient threshold condition by comparing characteristic index parameters of the vibration signal and the reference vibration signal.

At step A3, if the determination result of step A2 is yes, then it is confirmed that a vibration signal for indicating an occurrence of a confirmation type touch gesture is detected which meets a preset characteristic condition.

With respect to the vibration signal that is determined to meet the preset intensity condition, other characteristic index parameters than the amplitude need to be further examined in order to improve the determination reliability. Only a vibration signal that is caused by a finger tap on the panel is determined to be the needed signal. In addition to requiring the signal intensity to meet the preset characteristic condition, the vibration signal may be further examined by comparing with a pre-sampled reference vibration signal waveform in which frequency-domain parameters (for example, descriptive parameters relating to signal spectrum distribution) and time-domain parameters (for example, descriptive parameters relating to signal amplitude envelope shape) of the signal are computed using a voice recognition-like algorithm to obtain characteristic index parameters of the current vibration signal, the characteristic index parameters of the current vibration signal are compared against characteristic index parameters of the reference vibration signal to obtain similarity or correlation efficient between the two signals, and it is examined whether the vibration signal meets the condition in accordance with the preset similarity or correlation efficient threshold. If the condition is met, for example, the similarity or correlation efficient exceeds a certain value, then it is concluded that a reliable conforming signal is detected.

According to the above embodiment, during use of the touch terminal, when the system wants the user to input a touch operation representing "conformation" with a confirmation type gesture, as shown in FIG. 2, the touch terminal first detects at least one valid touch event at time T0, and after the time period Tb, examines at time T2 the vibration signals recorded starting from time T1. If a reliable conforming vibration signal is detected using the method described above, this vibration signal can be used to determine that there is a confirmation type touch gesture, and the touch terminal interprets the valid touch event occurring at time T0 as a confirmation type touch gesture and continues to execute subsequent confirmation operation. On the contrary, if no reliable conforming vibration signal is detected within this period of time, then the touch terminal system do not consider the occurring touch event as a confirmation type gesture operation and do not continue the subsequent executions.

It is noted that the present invention substantially provides a particular touch input gesture by combining a vibration signal with a touch event, which can not only be used for the confirmation touch gesture, but also can be used for other system-defined specific gestures, such as, a certain action in a game. If the combined touch event is a multi-touch event, then even more gesture combinations can be produced.

People skilled in the art can appreciate that part or all of the steps of the method of the above embodiments can be implemented by hardware under the instruction of program. The program may be stored on a computer readable medium such as ROM/RAM, magnetic disk, optical disc or the like.

Figure 6:
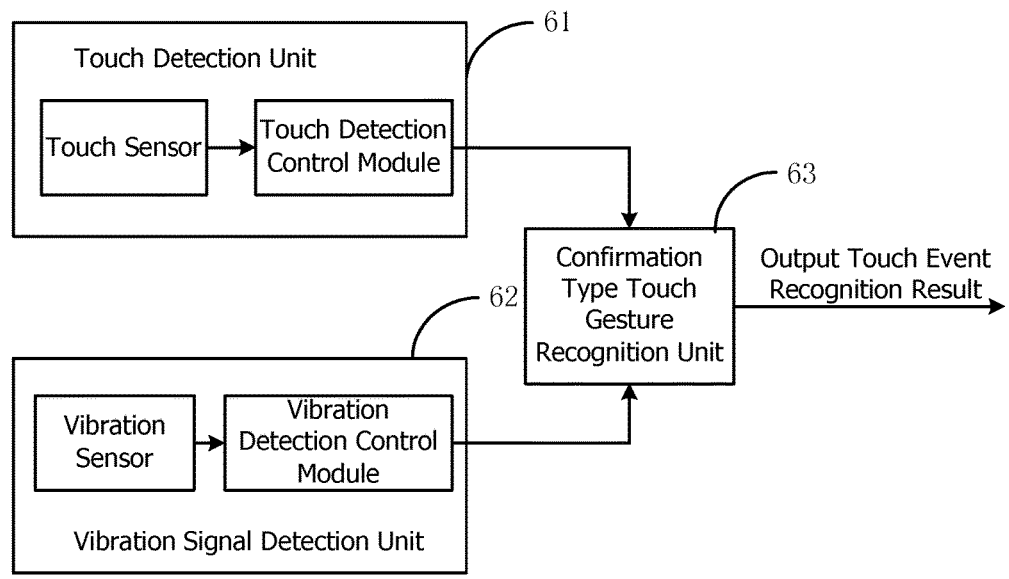
FIG. 6 illustrates a system for recognizing a confirmation type touch gesture by a touch terminal according to one embodiment.

FIG. 6 illustrates a system for recognizing confirmation type touch gesture by a touch terminal according to one embodiment of the present invention. For ease of description, only those parts relating to the present embodiment are shown. This system may be embedded in various touch terminals.

Referring to FIG. 6, the system for recognizing confirmation type touch gesture by a touch terminal includes a touch detection unit 61, a vibration signal detection unit 62, and a confirmation type touch gesture recognition unit 63. The touch detecting unit 61 is used to detect whether a valid touch event occurs on a touch screen of the touch terminal and may be specifically implemented by an array of touch sensors and a touch detection control module. As shown in FIG. 6, the touch sensors are coupled to the touch detection control module. The vibration signal detection unit 62 is used to detect whether there is a vibration signal for indicating the occurrence of a confirmation type touch gesture which meets a preset characteristic condition and is used to record the vibration signal. The vibration signal detection principle has been described above. After the touch detection unit 61 detects a valid touch event on the touch screen, the confirmation type touch gesture recognition unit 63 further determines whether the signal detected by the vibration signal detection unit 62 meets the preset characteristic condition of a vibration signal for indicating the occurrence of a confirmation type touch gesture. If the determination result is yes, then the valid touch event is recognized as a true confirmation type touch gesture operation and the recognition result is outputted.

As described above, the touch operation for indicating the occurrence of the confirmation type touch gesture is a tap type touch operation. The tap touch causes the touch terminal with a vibration sensor mounted to detect vibration of the touch terminal body. The vibration signal detection unit 62 includes the vibration sensor and a vibration detection control module. The vibration sensor may be microphone device or a micro-electro-mechanical systems (MEMS) device mounted within the touch terminal. The vibration sensor may be mounted at any suitable locations within the touch terminal as long as it can detect the vibration of the touch terminal. The vibration detection control module is coupled to the vibration sensor for determining whether a vibration signal indicative of an occurrence of a confirmation type touch gesture is detected which meets a preset characteristic condition within a preset period of time prior to and after the valid touch event.

It will be apparent to those skilled in the art that various modifications and variations can be made to the disclosed structure without departing from the scope or spirit of the invention. In view of the foregoing, it is intended that the present invention cover modifications and variations of this invention provided they fall within the scope of the following claims and their equivalents.

What is claimed is:

1. A method for recognizing an intended touch on a touch terminal, comprising:
   Step I: detecting at least one touch event at a first time;
   Step II: after step I, examining at a second time later than the first time whether a vibration signal which meets a preset characteristic condition is detected within a period of time; and
   Step III: recognizing the valid touch event as the intended touch when the determination result of step II is yes,
   wherein the step II comprises: presetting an amplitude threshold of the vibration signal;
   presetting a number threshold of sampling points of the vibration signal;
   calculating a total number of sampling points with amplitude beyond the amplitude threshold; and
   when the total number of the beyond-threshold sampling points exceeds the number threshold, determining the intensity of the vibration signal meets the intensity condition,
   wherein the touch event is caused by a touch and the vibration signal is caused by a tap, the touch and the tap occur at different positions, and
   wherein a position of the tap is outside the touch screen.

2. The method of claim 1, wherein the period of time set at step II is a continuous period, initiating at a third time prior to the first time and ending at the second time.

3. The method of claim 2, wherein the third time is prior to the first time with an interval less than 50 ms.

4. The method of claim 3, wherein the second time is later than the first time with an interval less than 50 ms.

5. The method of claim 1, wherein the step II comprises: determining whether an intensity of the vibration signal meets an intensity condition preset in the touch terminal.

6. The method of claim 5, wherein the step II further comprises:
   when the intensity of the vibration signal meets the intensity condition, comparing characteristic index parameters of the vibration signal and a reference vibration signal; and
   determining whether the vibration signal and the reference vibration signal meet a similarity or correlation coefficient threshold condition preset in the touch terminal.

7. The method of claim 6, wherein the characteristic index parameters comprise frequency-domain parameters and time-domain parameters.

8. The method of claim 1, wherein the touch event detection and the vibration signal are caused by a finger tap on a touch panel of the touch terminal.

9. A system for recognizing an intended touch on a touch screen of a touch terminal, comprising:
- a touch sensor mounted within the touch terminal and detecting a touch event;
- a vibration sensor mounted within the touch terminal and detecting a vibration signal; and
- a recognition unit mounted within the touch terminal;
- wherein the recognition unit is configured to determine whether the vibration signal is detected within a period of time initiating at a first time prior to the time when the touch event is detected and ending at a second time later than the time when the touch event is detected, and determine whether the vibration signal meets a characteristic condition preset in the touch terminal and recognize the touch as the intended touch when the vibration signal meets the characteristic condition,
- wherein the recognition unit is further configured to calculate a total number of sampling points of the vibration signal with amplitude beyond a preset amplitude threshold, and determine whether the total number of sampling points with amplitude beyond the preset amplitude threshold exceeds a preset number threshold,
- wherein the touch event is caused by a touch and the vibration signal is caused by a tap, the touch and the tap occur at different positions, and
- wherein a position of the tap is outside the touch screen.

10. The system of claim 9, wherein the vibration sensor is a microphone device.

11. The system of claim 9, wherein the vibration sensor is an MEMS device.

12. A touch terminal comprising the system of claim 9.

13. A touch terminal comprising the system of claim 10.

14. A touch terminal comprising the system of claim 11.

* * * * *

UNITED STATES PATENT AND TRADEMARK OFFICE
CERTIFICATE OF CORRECTION

PATENT NO. : 9,996,182 B2
APPLICATION NO. : 13/886281
DATED : June 12, 2018
INVENTOR(S) : Xinghuo Zhu Page 1 of 1

It is certified that error appears in the above-identified patent and that said Letters Patent is hereby corrected as shown below:

On the Title Page

The subject Letters Patent is issued from US Patent Application No. 13/886,281, which is a continuation of PCT Application No. PCT/CN2012/087692. However, the said information, i.e. item (63), is missing.

Signed and Sealed this
Twenty-third Day of October, 2018

Andrei Iancu
*Director of the United States Patent and Trademark Office*